United States Patent [19]

Butler et al.

[11] 3,880,750
[45] Apr. 29, 1975

[54] SEALING SURFACE GAUGE
[75] Inventors: Richard L. Butler; John W. Juvinall, both of Toledo, Ohio
[73] Assignee: Owens-Illinois, Inc., Toledo, Ohio
[22] Filed: June 6, 1974
[21] Appl. No.: 476,872

[52] U.S. Cl. ............ 209/111.7; 250/223 B; 356/198
[51] Int. Cl. ............................................. B07c 5/342
[58] Field of Search ......... 209/111.7, 111.6, 73, 74, 209/75; 250/223 B; 356/198, 239, 240

[56] References Cited
UNITED STATES PATENTS

| | | | |
|---|---|---|---|
| 3,107,011 | 10/1963 | Mathias et al. | 356/198 X |
| 3,171,033 | 2/1965 | Mathias et al. | 356/198 |
| 3,245,532 | 4/1966 | Quinn | 209/111.7 |
| 3,349,906 | 10/1967 | Calhoun et al. | 250/223 B |
| 3,386,579 | 6/1968 | Schulze et al. | 356/198 X |
| 3,533,704 | 10/1970 | Krenmayr | 250/223 B |
| 3,743,431 | 7/1973 | Cushing | 356/239 |

*Primary Examiner*—Allen N. Knowles
*Attorney, Agent, or Firm*—Steve M. McLary; E. J. Holler

[57] ABSTRACT

Apparatus and method for inspection of the sealing surface of a glass container. A glass container, having a finish portion with an annular rim or sealing surface, is rotated A light its vertical axis at an inspection station. Alight source focuses a thin line of light across the rim. A light sensor receives a reflection of this light from the rim, thus giving a normal light level signal. A defect in the rim causes a rise or fall in this normal light level signal. The signal caused by a defect is frequency filtered, with the normal light level signal being removed in the process, to give individual signals for different types of defects. These individual signals are then compared with pre-selected defect level signals and a defective container signal is generated if the pre-selected levels are exceeded.

34 Claims, 10 Drawing Figures

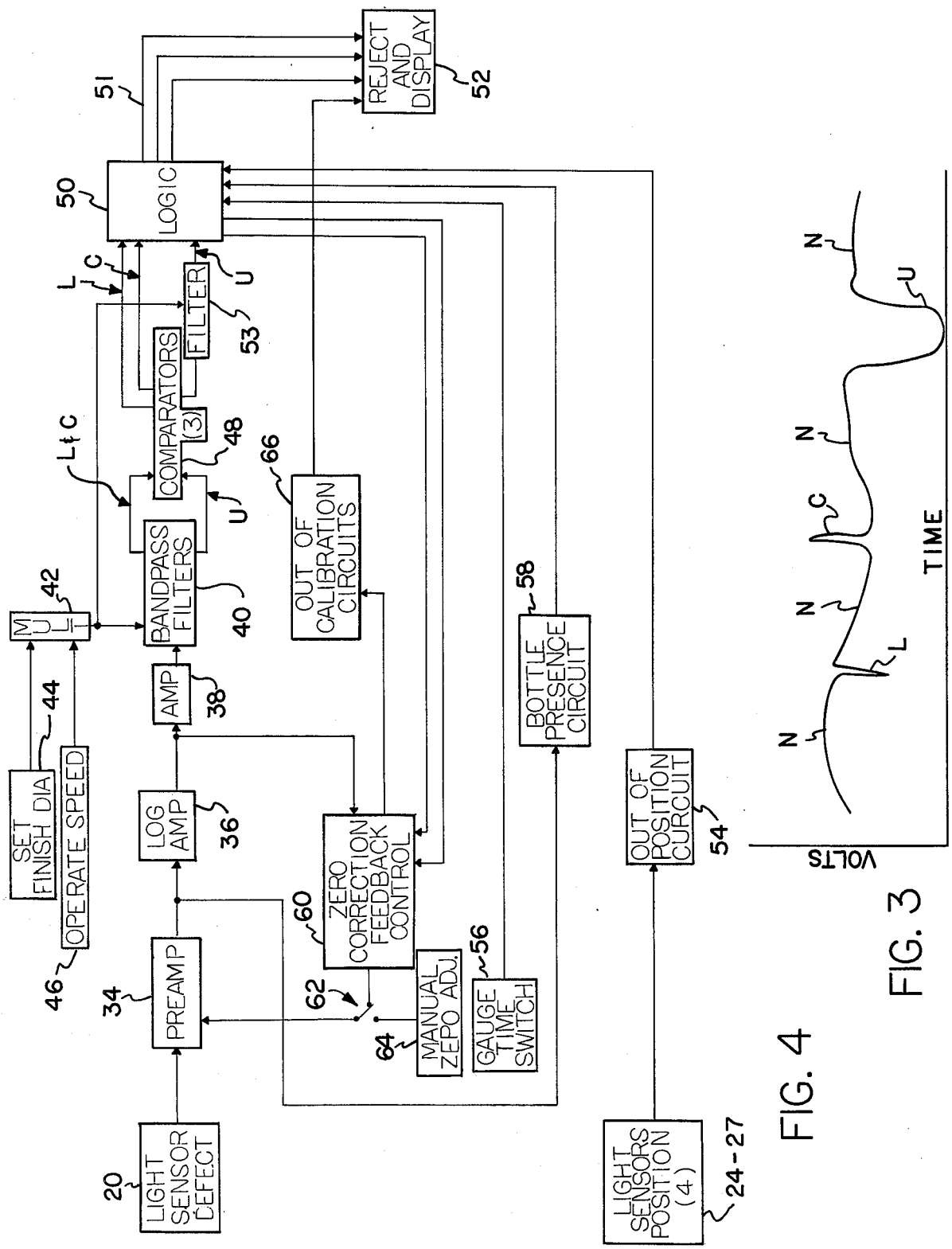

SEALING SURFACE GAUGE

BACKGROUD OF THE INVENTION

This invention generally relates to the inspection of glass containers. More particularaly, this invention relates to the inspection of the sealing surface of glass containers. Yet more particularly, this invention relates to the inspection of the sealing surface of glass containers by reflected light. Specifically, this invention relates to the inspection of the sealing surface of glass containers by reflected light wherein the reflected light generates an electrical signal which is frequency filtered and compared with pre-selected levels to determine the presence of a defect in the sealing surface.

A typical form of glass container has a finish portion with an annular rim extending around the finish and defining an opening into the container. The rim serves as a sealing surface for a closure for the container and thus must be free from defects or an imperfect seal will result. Among the defects in the rim are those known as line-over-finish (small cracks in th rim), open blisters, closed blisters and unfilled finishes. Many inspection devices in the prior have been designed to detect these defects. Examples of line-over-finish detectors may be seen in U.S. Pat. Nos. 3,107,011 and 3,395,573. However, none of the prior art devices could distinguish between multiple defects from a single reflected light signal. Our device can distinguish three distinct types of sealing surface defects using only a single light source and single main light sensor. Our signal processing system performs this separation of defect type and allows segregation of glass containers exhibiting any one of these defects. Illustrations of similar signal processing systems may be seen in U.S. Pat. No. 3,743,431 and British Pat. No. 1,045,693.

SUMMARY OF THE INVENTION

Our invention is an apparatus and method for the inspection of glass containers having a finish portion with an annular rim defining an opening into the container. At an inspection station, the glass container is rotated about its vertical axis. A light source is positioned above the rim to illuminate a portion of the rim. A main light responsive means receives light reflected from the rim and generates a first electrical signal with a substantially constant level when the rim is without defects and a second electrical signal, above or below the level of the first electrical signal, in response to a defect in the rim. An electronic circuit means connected to the main light responsive means electronically removes the first electrical signal and electronically frequency filters the second electrical signal to thereby produce two filtered signal components having different frequency characteristics. A comparator means receives the two filtered signal components and generates a defect signal if one of these filtered signal components exceeds either a pre-selected level greater than the first electrical signal level or a first pre-selected level less than the first electrical signal level and also generates a defect signal if the other one of the filtered signal components exceeds a second pre-selected level less than the level of the first electical signal level. A logic means will generate a defective bottle signal in response to any defect signal from the comparator means.

BRIEF DESCRIPTION OF THE DRAWINGS

FIG. 3 is a voltage versus time graph of wave forms generated by the main light sensor of the present invention, showing both normal and defect signal levels;

FIG. 4 is a block diagram of the signal processing circuits of the present invention;

DETAILED DESCRIPTION OF THE DRAWINGS

Figure 1:
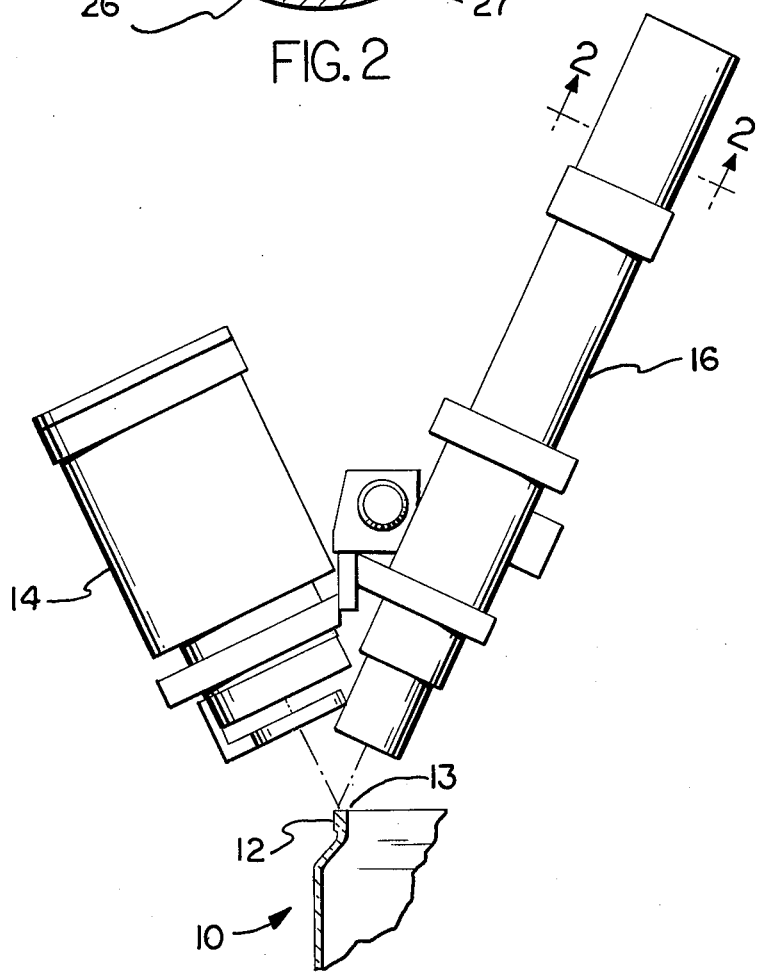
FIG. 1 is a partial side elevational view of the illumination of a glass container and receipt of reflected light from the glass container in accordance with the present invention.

In FIG. 1, a glass container 10 is shown which has a finish portion 12 with an annular rim 13 extending around the upper portion of the finish 12 and defining an opening into the glass container 10. The apparatus of the present invention is of the type which is designed to be used in conjunction with a glass container inspection machine such as that shown in U.S. Pat. No. 3,313,409. In this patent, it is seen that glass containers are indexed one at a time through a rotary type inspection device which performs various inspections for attributes of the glass containers at a plurality of inspection stations. Most of these inspection stations require that the glass container 10 be rotated, and the details of this particular function may be seen with reference to the cited patent. Thus, in FIG. 1, it should be assumed that the glass container 10 is in one of these inspection stations and is being rotated about its vertical axis. A light source 14 is positioned above the rim 13 to shine an intense spot of light onto the rim 13. A light receiving unit 16 is likewise positioned above the glass container 10 to receive light reflected from the rim portion 13. This general type of inspection technique is well known in the art of inspecting glass containers for defects. The majority of the prior art devices are designed such that the light source 14 and the light-receiving unit 16 are positioned relative to one another in such a manner that light is received by the light-receiving unit 16 only when a defect is present. However, there are examples in the prior art of light source and light-receiving unit configurations similar to that shown in FIG. 1. In particular, in FIG. 1, the angle of the center line of the light-receiver 16 to a vertical line is equal to the angle of the center line of the light source 14 to the same vertical line. Both units are in a common vertical plane. This arrangement allows the receiving unit 16 to receive any light which is reflected from the horizontal portion of the rim 13. That is, under normal circumstances, the light-receiving unit 16 will always be receiving reflected light from the rim portion 13 during the inspection cycle.

Figure 2:
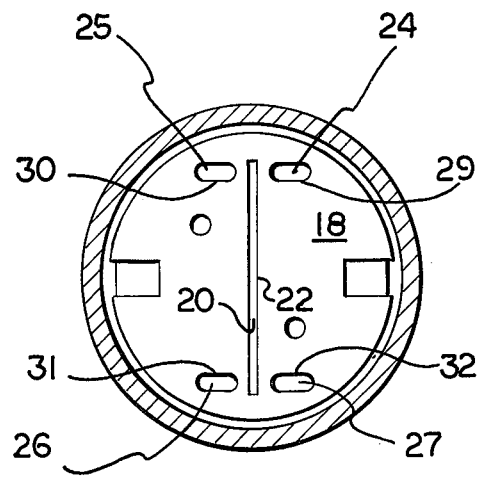
FIG. 2 is a cross sectional view taken along the line 2—2 in FIG. 1.

FIG. 2 illustrates a mask 18 which is mounted at the rearmost portion of the light-receiving unit 16. The mask 18 is designed to allow receipt of only a specific portion of the reflected light from the rim 13 for measurement purposes. In particular, a main light-responsive element 20, which may be a solar cell, is positioned behind an elongated slit 22 formed in the mask 18. The light-receiving unit 16 may include a lens system which magnifies the image of the rim portion 13 a factor of about five times. Thus, the elongated slit 22 is preferably made on the order of fifteen thousandths of an inch wide so that the main light-responsive element 20 is actually looking at a radial line over the rim portion which is only three thousandths of an inch wide. This very narrow line allows this particular apparatus to detect very small defects in the rim portion 13 which are known in the art as line-over-finsh defects. Four secondary light-responsive elements 24 through 27 are positioned off the center line of the elongated slit 22 behind respective elongated slits 29 through 32 formed in the mask 18. The light-responsive elements 24 through 27 may also be solar cells. The purpose of the four light-responsive elements 24 through 27 is to ensure that the glass container 10 is rotating in a substantially stable configuration and that the image of the rim portion 13 is not wobbling or moving in such a manner as to possibly lead to inaccurate defect detection. As will be explained later in detail, the light-responsive elements 24 through 27 may be used to inhibit the generation of a rejection signal should any one of them receive a light signal. Under normal operational conditions, the image from the rim portion 13 is carefully focused along the elongated slit 22 and the light-responsive elements 24 through 27 should not be illuminated or receive a light signal.

The apparatus of this invention is unusual in that it is able to distinguish three distinct types of flaws which occur in the rim portion 13 of the glass container 10 from a single signal generated by the main light-responsive element 20. FIG. 3 is a graph which illustrates all three types of defects as well as the normal operational level. It should be realized that the graph shown in FIG. 3 normally would not be encountered on a single glass container, but rather only one or the other of the defect signals illustrated in FIG. 3 would be seen in a single container which is inspected. Under normal conditions, the main light-responsive element 20 will produce an output signal or first electrical signal which is basically a DC signal and is generally designated as N in FIG. 3. It may be seen that the so-called N-signal does vary somewhat due to rotational irregularities and minor variations in the surface of the rim 13, but for all practical purpose it should be considered to be a DC signal and will be treated as such in further discussions of this apparatus. When a defect is present in the rim 13, a second electrical signal, above or below the level of the N-signal, will be generated by the light-responsive element 20. The signal noted as L is the type of signal which is detected when an open-type defect in the rim, such as a line-over-finish, an open blister or a so-called unfilled finish passes through the illuminated area. In this case, the amount of light which is reflected to the light-receiving unit 16 is decreased below the level designated as N and gives a wave form such as the wave form designated as L. When a defect such as a closed blister passes the inspection area, a rise in the light received by the light-receiving unit 16 occurs. This results since the closed-type defect is able to reflect light received by it in addition to that reflected from the rim 13 to a certain extent and thus gives a signal generally of the form designated as C in FIG. 3. It may be seen that the wave form C rises above the general level designated as N or the normal or DC level of this apparatus. The wave form designated as U in FIG. 3 is a special example of the general wave form previously designated as L in FIG. 3. It should be recalled that the wave form L resulted from open-type defects such as lines-over-finish, open blisters or unfilled finishes passing through the illuminated area. However, these three types of open defects are distinguishable from one another as a result of their differing sizes. The line-over-finish defect is typically quite small and would give the wave form designated as L. On the other hand, unfilled finishes tend to be much greater in extent than a line-over-finish defect and will generally give a wave form of the shape designated as U in FIG. 3. It will be noted that this is still a drop in signal level below that designated as N, but is of a much greater duration. Thus, it is possible, using the electronic discrimination apparatus herein described to distinguish between these three different types of defects and reject a glass container 10 which exhibits any one or all of these defects.

FIG. 4 illustrates in block form the electronic signal processing of the wave forms illustrated in FIG. 3. The main light-responsive element 20 or light sensor for defects has its output signal connected to a pre-amplifier or first amplifying means 34. The pre-amplifier 34 is a linear amplifier of the operational amplifier type and is used to raise the level of the signal from the main light-responsive element 20 to a level which may be conveniently dealt with. The output of the pre-amplifier 34 is connected to a logarithmic amplifier or logarithmic amplifying means 36. The logarithmic amplifier 36 is used for the sake of convenience to remove the DC signal component, or the wave form designated as N in FIG. 3, for further processing of the signal. It is desired to use only those signals such as L, C and U which contain defect information. The output of the pre-amplifier 34 may be considered to be a DC level times a percentage change of this DC level where the percentage change, independent of the DC level, is a signal which is desired. Thus, the output of the log amplifier 36 may be expressed, where the DC level is designated as D and the percentage change is designated as X, as a signal which is log D plus log X. Further in the processing system, as will be explained later, the resultant signal is AC coupled and the log D component is removed since it is a basically constant component. Next, the output of the log amplifier 36 is connected to an input amplifier or second amplifying means 38 for a band pass filter unit or band pass filter means 40. It is possible to consider the pre-amplifier 34, the logarithmic amplifier 36, the input amplifier 38 and the band pass filter unit 40 as a single electronic circuit means. The function of this electronic circuit means is to electronically remove the first electrical signal and to electronically frequency filter the second electrical signal to produce two filtered signal components having different frequency characteristics. The input amplifier 38 is designed to further increase the signal level and may also be used to correct for parameter variations of the logging elements that are used in the log amplifier 36. The band pass filters 40 remove the log D term from the signal that is introduced to them. In addition, the band pass filters 40 also segregate the incoming signal into signals of the general type L and C or type U as a function of their respective frequencies, and thus have two output filtered signal components designated as L and C and U. Note that at this point the distinction between L-type signals and C-type signals has not been made. As the term band pass filter implies, the band pass filter unit 40 is designed to inhibited signals which exhibit frequencies beyond the expected range of signals such as L, C or U. The information signals are somewhat dependent upon the diameter of the finish portion 12 of the glass container 10 and the operational speed of the inspection machine. To compensate for these variations, a multiplying unit 42 furnishes to the band pass filter unit 40 a signal which includes correction factors for the finish diameter and the machine operational speed. The multiplifier 42 is furnished with these signals from a switching unit 44 to set the finish diameter and a speed unit 46 which gives the machine operational speed. The speed unit 46 may be constructed as a counter circuit which actually counts the time between successive gauging operations, may be a digital tachometer which produces an output signal that is proportional to the operational speed of the machine, or may be an analog integrator. The output signal from the band pass filter unit 40 is connected to a comparator unit or comparison means 48 which has three comparators that actually split the signals into the L, C and U-type of defect signals. The output of the comparator unit 48 is then three output signal lines carrying a defect signal depending upon whether a C, L or U-type defect has been detected, and these lines are connected to a logic unit or logic means 50. The logic unit 50 then produces a single defective bottle output signal on a suitable output line 51 connected to a reject and display unit 52 which will cause rejection of a glass container exhibiting one or more of these defects. There are shown two additional output lines from the logic unit 50 connected to the reject and display unit 52, and these are output signals which are used only to light warning lights or to operate warning devices in the event of out-of-limits operation. It may be noted that a filter 53 is connected in series between the comparator unit 48 and the logic unit 50 in the line which carries the output signal U. The filter 53 is a digital filter which is designed to remove pulses which are of a width less than a time T where the time T is inversely proportional to the signal presented by the multiplier 42. It will be noted that the output of the multiplier 42 is connected to the filter 53. This signal is one which relates the finish diameter and the operational speed of the machine. This filtering function is designed to relate the pulse removed to defect size rather than to a set time period. The four light-responsive elements 24 through 27 are connected to an out-of-position circuit 54 whose output is then connected to the logic unit 50. As previously pointed out, when a signal is received by any one of the four light-sensing elements 24 through 27, it is assumed that the glass container 10 is not rotating properly and a rejection signal from the logic unit 50 should be inhibited. A gauge time switch 56 is connected to the mechanism an output signal during the entire time that a glass container 10 is in an inspection station. The gauge time switch 56 may be a simple cam operated switch which is held in a stationary position on the machine and is opened and closed by the rotational cycle of the machine as the glass container 10 is transferred from station to station. This type of switch may be seen in U.S. Pat. No. 3,273,710. The gauge time switch 56 is also connected to the logic unit 50 and is used for a timing function. In addition, it is desirable that the logic unit 50 be assured that a glass container 10 is actually present and being inspected before any signals are accepted. To achieve this, a bottle presence circuit 58 is connected to the output of the pre-amplifier 34 and the output of the bottle presence circuit 58 is then connected to the logic unit 50 to furnish a signal assuring that a glass container 10 is indeed in position to be inspected. In theory, the output of the pre-amplifier 34 should be zero whenever a glass container 10 is not being inspected. However, the possibility exits of some drift in the components of the pre-amplifier 34, such a drift presenting an offset component in the signal which would lead to inaccuracies in measuring. Therefore, the output of the log amplifier 36 is connected to a zero correction feedback control unit 60. During the time when the inspection station is empty of a glass container 10, the zero correction unit 60 will examine the output of the log amplifier 36 and if this output is not zero will generate an appropriate correction signal which is then transmitted to the pre-amplifier 34 through a switch 62 to correct the pre-amplifier 34 so that it does present a true zero output singal. The switch 62 is a two-position switch, and if desired may be connected to a manual zero adjustment unit 64 for manual adjustment of the zero of the output of the pre-amplifier 34. It should be noted that the logic unit 50 has at least two output lines which are connected to the zero correction unit 60 to provide timing and control functions for the zero correction unit 60. An output of the zero correction unit 60 is connected to an out-of-calibration circuit 66. If the zero correction unit 60 is unable to properly zero the pre-amplifier 34 or if the machine has not properly stabilized during start-up, the out-of-calibration circuit 66 will generate an output signal which is connected to the reject and display unit 52 and will illuminate a warning device so that an operator of the machine will know that the pre-amplifier 34 is not operating properly.

In the following description of the detailed circuit diagrams of the components which make up the block diagram shown in FIG. 4, several assumptions are made which should be noted at this time. All circuit elements are assumed to be ideal elements, for example, diodes. In addition, the circuit is assumed to have a positive voltage supply, designated as V+ and a negative voltage supply, designated as V−. Active elements of the circuit deleted for the sake of simplicity, such connections being obvious to one skilled in the art. Likewise, for the sake of simplicity, resistors and capacitors which are used simply for the sake of noise suppression or saturation prevention of amplifiers are omitted, again it being assumed that their use and position would be obvious to one skilled in the art. The use of specific voltage levels or signs, in particular with respect to the connection to the input terminals of operational amplifiers, is simply by way of illustration and should not consider to be limiting. That is, it would be possible to operate such a circuit in the inverse manner from that which is illustrated in the following drawings.

Figure 5:
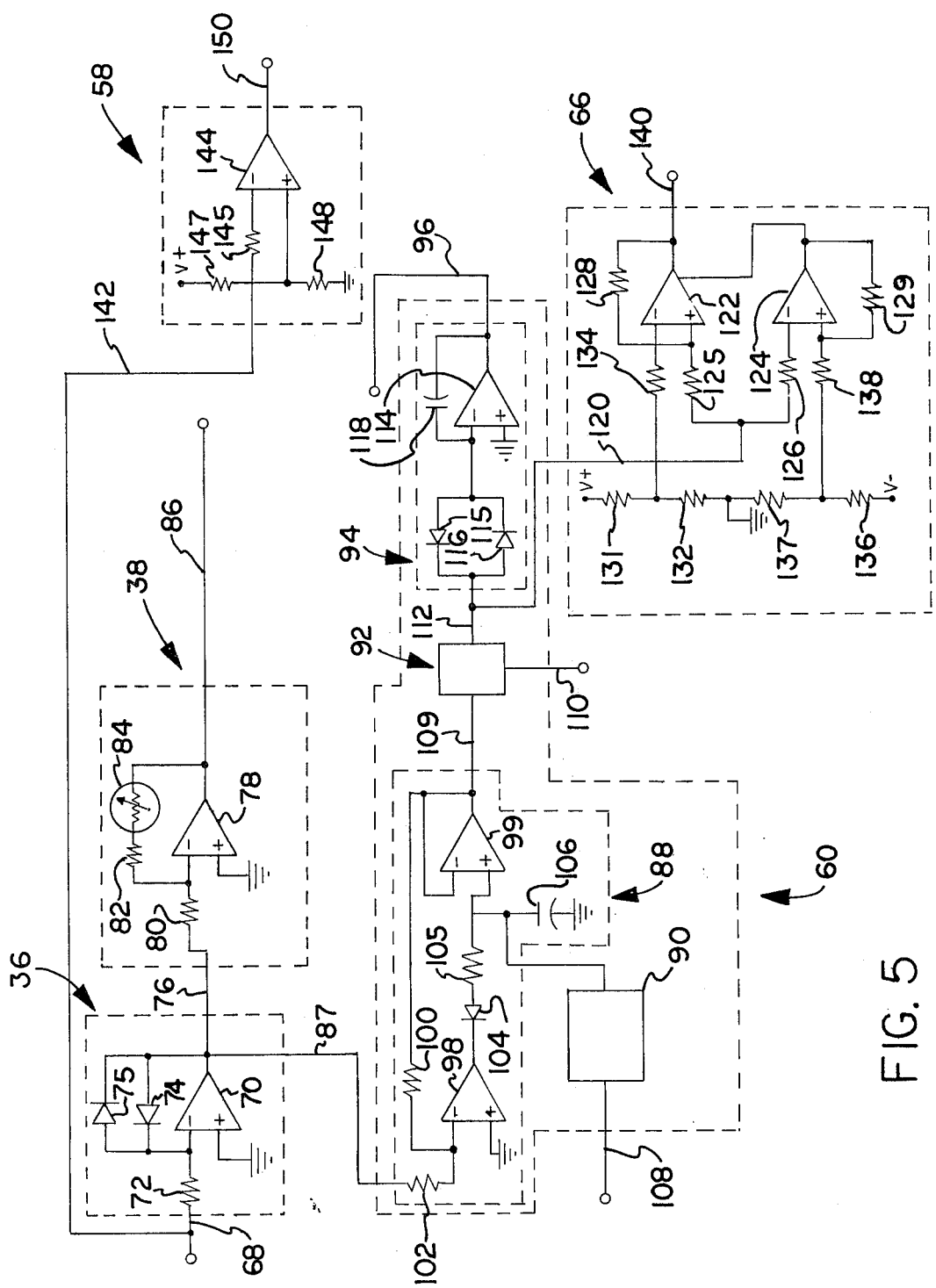
FIG. 5 is a schematic circuit diagram of the logarithmic amplifier, second amplifier, bottle presence circuit, zero correction feedback control and out-of-calibration circuit shown in FIG. 4.

In FIG. 5, the signal from the pre-amplifier 34 enters the log amplifier 36 through an electrical conductor 68. The major component of the log amplifier 36 is an operational amplifier 70. The operational amplifier 70 has positive and negative input terminals and an output terminal. The positive input terminal of the operational amplifier 70 is grounded. The signal along the input conductor 68 enters the negative input terminal of the operational amplifier 70 through an input resistor 72. Two diodes 74 and 75 are connected in a feedback loop between the negative input terminal and the output terminal of the operational amplifier 70. It is the diodes 74 and 75 which force the operational amplifier 70 to operate as a logging type amplifier. That is, the output of the operational amplifier 70 is the log of the input signal to it. The output terminal of the operational amplifier is connected to a conductor 76. The major component of the input amplifier 38 is an operational amplifier 78. Again, the operational amplifier 78 has positive and negative input terminals, with the positive input terminal being grounded, and an output terminal. The signal carried by the conductor 76 from the log amplifier 36 is connected to the negative input terminal of the operational amplifier 78 through an input resistor 80. As is conventional practice with operational amplifiers, the total gain factor through the amplifier is a function of a ratio of the input resistor 80 and a combined resistance of a feedback loop connected between the negative input terminal and the output terminal. In this case, the feedback loop contains a fixed resistor 82 and a temperature variable resistor 84. The temperature variable resistor is necessary because the diodes 74 and 75 are themselves somewhat temperature sensitive. Thus, the actual output of the log amplifier 36 may vary as a function of the temperature of the environment in which the diodes 74 and 75 are lcoated. In order to maintain a constant gain factor through the input amplifier 38, it is therefore necessary to compensate for this temperature variation. Thus, the temperature variable resistor 84 is included in the feedback loop of the operational amplifier 78 to vary the gain factor of the operational amplifier 78 as a function of the temperature of the temperature variable resistor 84. By locating the diodes 74 and 75 in close proximity to the temperature variable resistor 84, the temperature seen by all three of these elements may abe assumed to be the same, and therefore the gain factor of the input amplifier 38 with respect to the log amplifier 36 may be maintained constant. The output of the operational amplifier 78 is through a conductor 86. Note that the output conductor 86 is terminated at a point, and it will then be carried forward into the band pass filter unit 40 on a following drawing figure. This convention will be used throughout the description of these drawing figures. As was seen in FIG. 4, the output of the log amplifier 36 is sent through the zero correction feedback unit 60 to assure that the pre-amplifier 34 maintains a zero output at times when no glass container 10 is being gauged. An electrical conductor 87 connects the output of the log amplifier 36 to the zero correction feedback unit 60. The conductor 87 is first passed through a minimum detector means 88. The minimum detector means 88 is reset through a first switching means 90, which may be a conventional transistor switching circuit. The output of the minimum detector means 88 passes through a second switch means 92 which may also be a transistor switching circuit. The second switch means 92 then connects the output of the minimum detector means 88 to an integrator means 94. The output of the integrator means 94 is an electrical conductor 96 which is connected to an input of the operational amplifier which makes up the pre-amplifier 34. The minimum detector means 88 includes two operational amplifiers 98 and 99. Both of the operational amplifiers 98 and 99 have a positive input terminal, a negative input terminal and an output terminal. The output terminal of the operational amplifier 99 is connected to the negative input terminal of the operational amplifier 98 through a feedback resistor 100. The conductor 87 carrying the output signal from the log amplifier 36 is connected to the negative input terminal of the operational amplifier 98 through a fixed resistor 102. The resistors 100 and 102 preferably are the same value so that the gain through the two amplilfier combination 98 and 99 is essentially unity. A diode 104 and a resistor 105 are connected in series between the output terminal of the operational amplifier 98 and the positive input terminal of the operational amplifier 99. A capacitor 106, preferably of the polycarbonate type, is connected into the line connecting the output terminal of the amplifier 98 to the positive input terminal of the amplifier 99 between the diode and the positive input terminal of the amplifier 99. The capacitor 106 is grounded. The positioning of the diode 104 is such that the capacitor 106 will always be maintained in a charged state that represents the lowest or the minimum voltage which has been transmitted by the conductor 87 from the log amplifier 36. Thus, in the ideal state, the charge on the capacitor 106 would be zero or the voltage indicated by the capacitor 106 would be zero. The amplifier 99 serves as an isolation output amplifier to prevent rapid discharge of the capacitor 106, resulting from the extremely high resistance of the operational amplifier 99 in the reverse direction. At the end of any particular gauging cycle, the first switch means 90 is activated by a signal transmitted along a conductor 108 from the logic unit 50. The output of the first switch means 90 is normally a zero signal, and this is connected to the capacitor 106. When the signal is present on the conductor 108, the capacitor 106 is reset to an initial condition state in readiness for accepting the next zero correctional cycle. The output of the amplifier 99 is transmitted through a conductor 109 to the second switch means 92. So long as the switch means 92 is off, the signal may not be transmitted further. A signal from the logic unit 50 is transmitted through an electrical conductor 110 to turn on the second switch means 92. The second switch means 92 is turned on at the end of a gauging cycle at the time at which the inspection of a glass container is completed. The signal from the minimum detector means 88 is then passed through the second switch means 92 to an electrical conductor 112 to the integrator means 94. This signal is connected to the negative input terminal of an operational amplifier 114. Before reaching the input terminal of the operational amplifier 114, the signal must pass through two diodes 115 and 116 connected in parallel. The diodes 115 and 116 are substantially identical to the diodes 74 and 75, and by virtue of being connected in the input side of the operational amplifier 114 they serve an antilogging function. That is, the signal carried along the conductor 112 is still a log signal, since it originated from the output of the log amplifier 36. Thus, this log function must be removed before corrections can be made to the pre-amplifier 34. Therefore, a signal which enters the operational amplifier 114 has the logarithmic factor removed from it. A capacitor 118 is connected in a feedback loop between the negative input terminal of the operational amplifier 114 and the output terminal of the operational amplifier 114. The positive input terminal of the operational amplifier 114 is grounded. Thus, the signal received by the operational amplifier 114 is a linear error signal, if any is present, and represents the minimum of the pre-amplifier signal. The feedback capacitor 118 causes the operational amplifier 114 to function as an integrator and the signal is then integrated and fed back to the pre-amplifier 34. This integrator will integrate up or down until the minimum output of the pre-amplifier 34 is zero. The output of the second switch means 92, keeping in mind again that this is basically the minimum output of the log amplifier 36, is connected through an electrical conductor 120 to the positive input terminal of a first operational amplifier 122 and the negative input terminal of a second operational amplifier 124 through respective input resistors 125 and 126. The operational amplifiers 122 and 124 are a part of the out-of-calibration circuit 66. It is the purpose of the out-of-calibration circuit 66 to provide a warning signal when the value of the error signal produced by the pre-amplifier 34 goes above or below a particluar pre-selected valve. This is an indication that either the pre-amplifier 34 is not functioning properly, the zero correction feed back unit 60 is not functioning properly, the electronics have not yet stabilized, or some combination of these factors. In any of these events, it is desirable that a warning be generated to take into account the fact of an abnormal condition somewhere within the system. Each of the operational amplifiers 122 and 124 have their terminals connected in feedback loop to their positive input terminals through respective feedback resistors 128 and 129. A voltage divider formed by resistors 131 and 132 connected to the positive voltage supply for the circuit is connected to the negative input terminal of the operational amplifier 122 through an input resistor 134. A second voltage divider formed by resistors 136 and 137 connected to the negative voltage supply for the circuit is connected to the positive input terminal of the operational amplifier 124 through an input resistor 138. The circuit thus described forms a comparator type of circuit which will give an output from the operational amplifier 122 output terminal along a conductor 140 whenever the value of the signal from the log amplifier 36 exceeds a pre-set level determined by the two voltage dividers previously described. It should be noted that the output of the second operational amplifier 124 is actually connected internally to the first operational amplifier 122. By way of example, both of the operational amplifiers 122 and 124 may be a model LM 311H manufactured by National Semiconductors. The connection of the output terminal of the second operational amplifier 124 is to the pin designated 1 on the possible connections to the first operational amplifier 122. The final circuit shown on FIG. 5 is that for the bottle presence circuit 58. An electrical conductor 142 carries the signal from the conductor 68, which is the output from the pre-amplifier 34, to the negative input terminal of an operational amplifier 144 through an input resistor 145. A voltage divider made of up resistors 147 and 148 connected to the positive voltage supply is connected to the positive input terminal of the operational amplifier 144 to furnish a comparison level. When the signal from the pre-amplifier 34 indicates that a bottle is present and being inspected, the operational amplifier 144 will furnish an output signal from an output terminal along an electrical conductor 150 connected to the logic unit 50.

Figure 6:
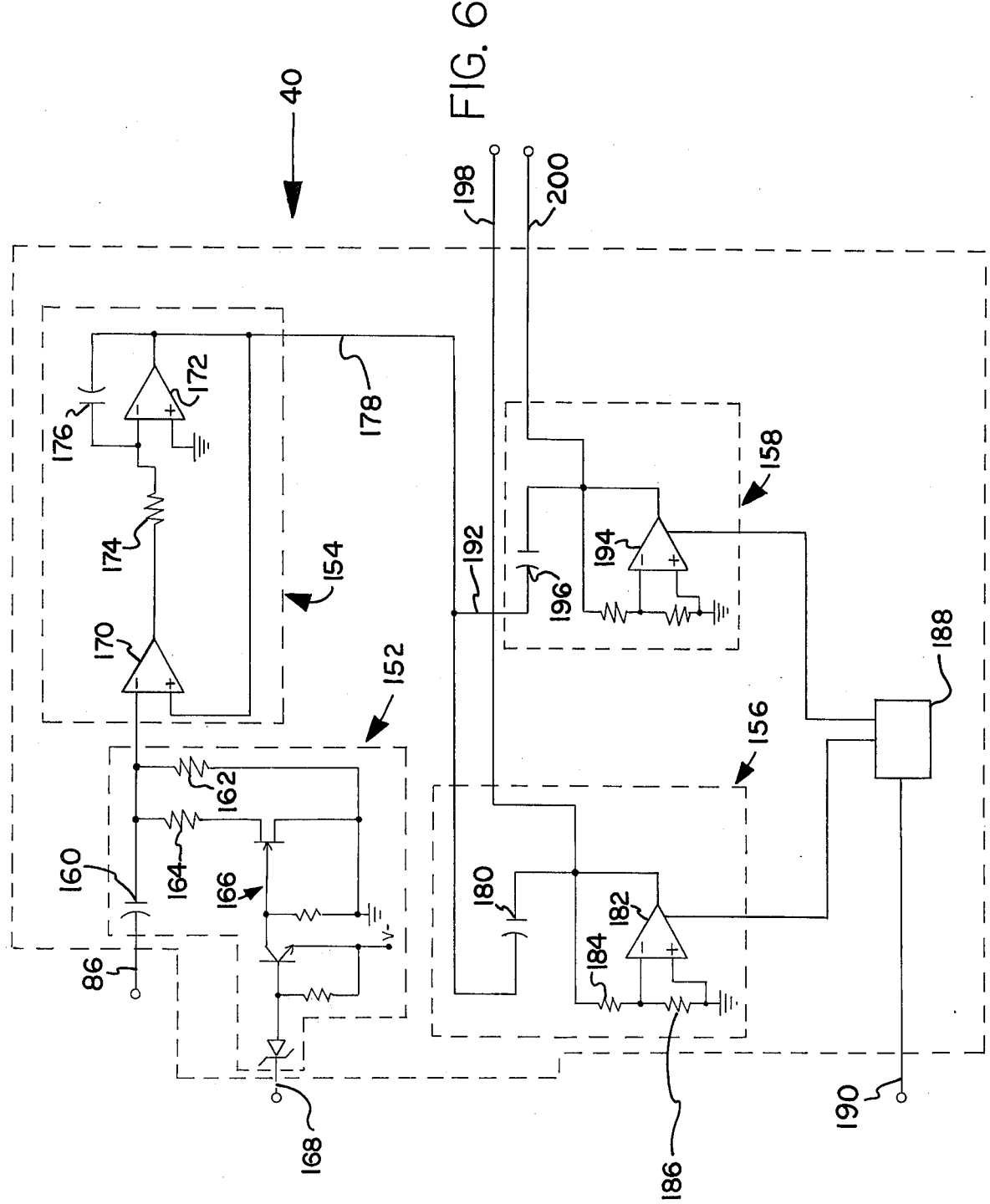
FIG. 6 is a schematic circuit diagram showing the bandpass filter unit shown in FIG. 4.

In FIG. 6, the conductor 86 carries the signal from the amplifier 38 into the band pass filter unit 40. In the band pass filter unit 40, the signal passes through a first high pass filter 152 and then into a non-linear low pass filter 154. Out of the non-linear low pass filter 154 the signal is split into two components and passed through a second high pass filter 156 and a third high pass filter 158. In the first high pass filter 152, the primary filtering function is performed by an RC network defined by a capacitor 160 and a resistor 162. This RC network will give a filter constant or band pass constant which may be designated as $\lambda 1$. A filter of this type, of course, is designed to pass only AC signals and thus effectively AC couples the signal which is presented by the amplifier 38. This then removes the DC component of the normal signal and will pass only those signals which are generated by defects in the glass container 10. By way of example, the value of the capacitor 160 may be 2.2 microfarads and the value of the resistor 162 may be 33 kilohms. It is well known that the value of $\lambda 1$ is, of course, dictated by the values of the resistor-capacitor combination. In addition, the first high pass filter also contains a second resistor 164 of a much smaller value than the first resistor 162, for example 3.3 kilohms. The purpose of having a second resistor 164 is to allow the time constant for the frequency pass value to be varied depending upon whether or not a glass container 10 is being gauged. When a glass container 10 is not being gauged it is desirable to have the high pass filter 152 contain a very short time constant to allow the filters to stabilize themselves. Thus, a transistor switching network generally designated as 166 is connected through ana electrical conductor 168 to the logic unit 50. Whenever the apparatus is not gauging a glass container 10 a signal will be absent on the conductor 168 to turn the transistor switching network 166 on and thus bring the second resistor 164 into the RC combination. In this event, the very small value of the second resistor 164 relative to the first resistor 162 will dominate the filter factor and therefore generate a much shorter time constant for the first high pass filter 152 under such circumstances. The output of the first high pass filter 152 is connected to the negative input terminal of a first operational amplifier 170 of the non-linear low pass filter 154. The output of the first operational amplifier 170 is connected to the negative input terminal of a second operational amplifier 172 of the non-linear low pass filter 154 through an input resistor 174. The output of the second operational amplifier 172 is connected to the positive input terminal of the first operational amplifier 170. The positive input terminal of the second operational amplifier 172 is grounded. A capacitor 176 is connected in a feedback loop between the output terminal of the second operational amplifier 172 and the negative input terminal of the second operational amplifier 172. This then makes the second operational amplifier 172 function as an integrator. The output of the first operational amplifier 170 must always be such as to make the first operational amplifier 170 equal to the output of the second operational amplifier 172. The net result of this is that the positive or negative derivative of the output is limited to a fixed value. So long as the input signal to the first operational amplifier 170 from the first high pass filter 152 remains within normal range limits, the output of the non-linear low pass filter 154 will be equal to this input value. The purpose of the non-linear low pass filter is to remove noise pulses independently of the magnitude of such pulses. Thus, the output of the non-linear low pass filter 154 will always be going up at a constant rate. This completely ensures filtering of extremely high frequencies which are known not to contain defect information. An electrical conductor 178 takes the signal from the non-linear low pass filter 154 to the second high pass filter 156. The second high pass filter 156 is designed with a band pass frequency such that it will pass frequencies of signals only in the range represented by signals such as L and C in FIG. 3. It should be noted again that both of these defect signals exhibit the same general frequency characteristics and amplitude characteristics, but one is a positive going signal with reference to the DC or N level while the other is negative going. The signal is basically filtered by an RC filter network which includes a capacitor 180. The R or resistance for this filter network is provided in an unusual manner to compensate for the different frequencies resulting from changes in container diameters and operational speeds of the machine. It would be possible to adjust this resistance in terms of a variable resistor for each situation, but it has proven more convenient to use the two factors through the multiplying unit 42 and compensate automatically in this manner. The basic resistance function is provided by a transconduction form of operational amplifier 182. This operational amplifier may be a model CA3080 manufactured by Radio Corporation of America. The characteristics of this amplifier are such that the current output is proportional to the voltage input and it thus acts as a resistor. The capacitor 180 is connected to the operational amplifier 182 thorugh a resistor 184 connected to the negative input terminal of the amplifier 182. A second resistor 186 is also connected to the input resistor 184 and to ground. The positive input terminal of the operational amplifier 182 is connected to ground. The input current signal is furnished through a conventional voltage-to-current converter 188. The voltage-to-current converter 188 receives its input voltage signal from the multiplier unit 42 through an input conductor 190. The net result of this entire circuit is that the output of the second high pass filter 156 will be a signal in a specific frequency range, with the range being varied as a function of the diameter of the container being inspected and the operational speed of the machine. The connection to the transconduction operational amplifier 182 may be to pin number 5 of this specific amplifier from the voltage-to-current converter 188. The third high pass filter 158 is connected to the conductor 178 through a branch conductor 192. The third high pass filter 158 also uses a transconduction operational amplifier 194 which is identical to the operational amplifier 182. The operation of the third high pass filter 158 is identical to the operation of the second high pass filter 156, and a detailed explanation of the operation is not believed necessary. The third high pass filter is also basically an RC network using an input capacitor 196 with the operational amplifier 194 again serving as a variable resistance. While the high pass filters 156 and 158 operate in an identical fashion and use substantially identical components, the wave length which is filtered by these two filters is different. As is well known, the actual wave length which is passed is a function of the resistance and capacitance, and in this case the capacitance of the two filters is adjusted to provide the varying passed frequencies. By way of example, the capacitor 180 may be 0.0015 microfarads and the capacitor 196 may be 0.01 mimcrofarads. The output of the second high pass filter 156 is through a conductor 198 which carries information as to defect signals of the type designated as L and C in FIG. 3. The output from the third high pass filter 158 is through a conductor 200 which carries information of defect signals of the type designated as U in FIG. 3.

Figure 7:
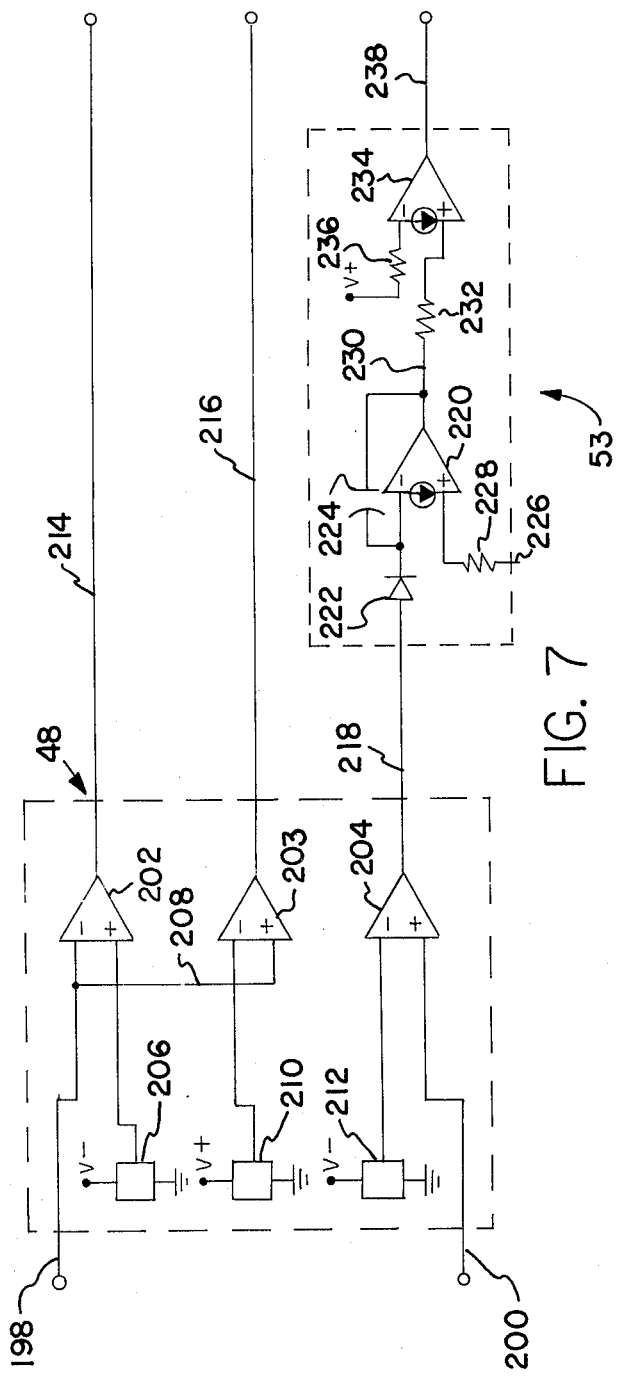
FIG. 7 is a schematic circuit diagram of the comparator unit and digital filter shown in FIG. 4.

In FIG. 7, it may be seen that the comparator unit 48 is made up of three operational amplifiers 202, 203 and 204. The operational amplifiers 202 through 204 are all substantially identical and have positive and negative input terminals and an output terminal. These operational amplifiers are simply used as comparators to compare the value of the input signal to a preset level and generate an output signal if the input signal exceeds the preset level. The operational amplifier 202 has the conductor 198 from the second high pass filter 156 connected to its negative input terminal. To its positive input terminal is connected a voltage signal from the negative voltage supply that is passed through a variable resistor 206 which is grounded. The variable resistor 206 provides the comparison level for the operational amplifier 202. The use of a variable resistor 206 allows adjustment of the level at which a signal will cause rejection of a glass container 10. The operational amplilfier 203 also has the signal carried by the conductor 198 connected to it through a branch conductor 208 connected to the positive input terminal of the operational amplifier 203. The negative input terminal of the operational amplifier 203 is connected to a variable resistor 210 which is connected to the positive voltage supply and to ground. Again the purpose of the variable resistor 210 is to furnish a variable level for rejection of glass containers. The conductor 200 carrying the signal from the third high pass filter 158 is connected to the positive input terminal of the operational amplifier 204. A third variable resistor 212 is connected to the negative input terminal of the operational amplifier 204 and to the negative voltage supply and to ground. This again furnishes a voltage level for comparison with the signal from the third high pass filter 158. It will be noted now that the three distinguishable defect signals designated as L, C and U in FIG. 3 have been completely separated from one another and from the general DC level signal designated as N in FIG. 3. The output of the operational amplifier 202 is through a conductor 214 which will carry a signal should a defect wave form of the type designated as L occur during the gauging cycle. It should be realized, of course, that the actual output of the operational amplifier 202 will no longer be the wave form L, but will simply be a signal which indicates that this particular type of wave form has been detected. This is also the case with the operational amplifiers 203 and 204 in terms of their outputs. All three of the operational amplifiers 202 through 204 will simply give a steady level output should a signal of the type which they are designed to detect be received by their inputs. The output of the operational amplifier 203 is to a conductor 216 which will carry a signal if a defect of the type designated as C in FIG. 3 is detected. Finally, the operational amplifier 204 has an output conductor 218 which will similarly carry a signal if a defect signal of the type designated as U in FIG. 3 has been detected. The output conductor 218 in the operational amplifier 204 is connected to the digital filter 53. As was noted the digital filter 53 is designed to remove pulses of a specific short time period. This particular filter is largely a safety measure to ensure that high frequency signals may not be accidentally passed through the third high pass filter 158. The conductor 218 is connected to the negative input terminal of an operational amplifier 220 through a diode 222. The operational amplifier 220 is of the current type and may be a model LM3900 manufactured by National Semiconductor. A feedback capacitor 224 is connected between the negative input terminal of the operational amplifier 220 and the output terminal of the operational amplifier 220. The multiplying unit 42 is connected to the positive input terminal of the operational amplifier 220 through a conductor 226 and an input resistor 228. Note that it was said that the purpose of the digital filter 53 is to pass pulses which exceed a certain time period. Because the operation of the machine, as has been previously explained, is basically time-dependent, it is necessary to compensate for variations in the diameter of the finished of the glass container 10 and for the operational speed of the machine. As previously explained, this is done through the multiplier 42. Thus the signal which enters the operational amplifier 220 is a correctional signal which takes into account varying finish diameters and machine operational speeds. With the capacitor 224 in a feedback loop with the operational amplifier 220 the operational amplifier 220 operates as an integrator. The output of the operational amplifier 220 is connected through a conductor 230 and an input resistor 232 to the positive input terminal of a second operational amplifier 234. The operational amplifier 234 is also of the current type and may be identical to the operational amplifier 220. The negative input terminal of the operational amplifier 234 is connected to the positive voltage supply through an input resistsor 236. The input resistor 236 provides a fixed level of comparison for the operational amplifier 234. Thus the operational amplifier 234 acts as a comparator and if the input signal to it reaches a particular level, it will give an output signal. However, the integrating operational amplifier 220 is set to screen signals whose pulse width is too small. The output from the digital filter 53, or more properly from the second operational amplifier 234, is through a conductor 238 which will carry a signal for defects in the glass container that produces wave forms of the type designated as U in FIG. 3.

Figure 8:
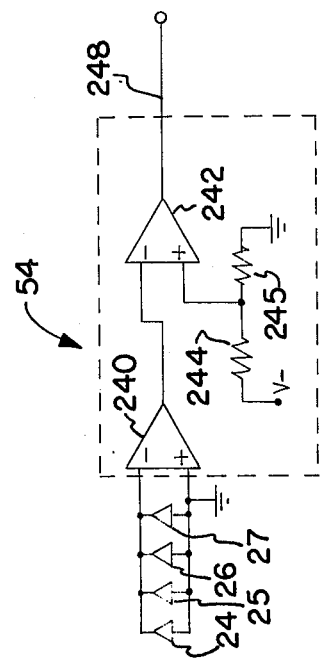
FIG. 8 is a schematic circuit diagram of the out-of-position circuit shown in FIG. 4.

In FIG. 8, the four light-responsive elements 24 through 27 are seen as being connected in parallel to the input terminals of a first operational amplifier 240 which is a part of the out-of-position circuit 54. The operational amplifier 240 simply acts as a pre-amplifier to boost the signal from these light-responsive elements 24 through 27 to a more useable level. Note that by connecting the four light-responsive elements 24 through 27 in parallel a singal from any of these light-responsive elements will cause a positive reaction within the circuit. The output of the first operational amplifier 240 is connected to the negative input terminal of a second operational amplifier 242. A voltage divider made up of resistors 244 and 245 connected to the negative voltage supply of the circuit and to ground is connected to the positive input terminal of the operational amplifier 242 to provide a level for comparison. Whenever a signal is received from the operational amplifier 240 which exceeds this level an output is generated from the operational amplifier 242 along a conductor 248.

Figures 9, 10:
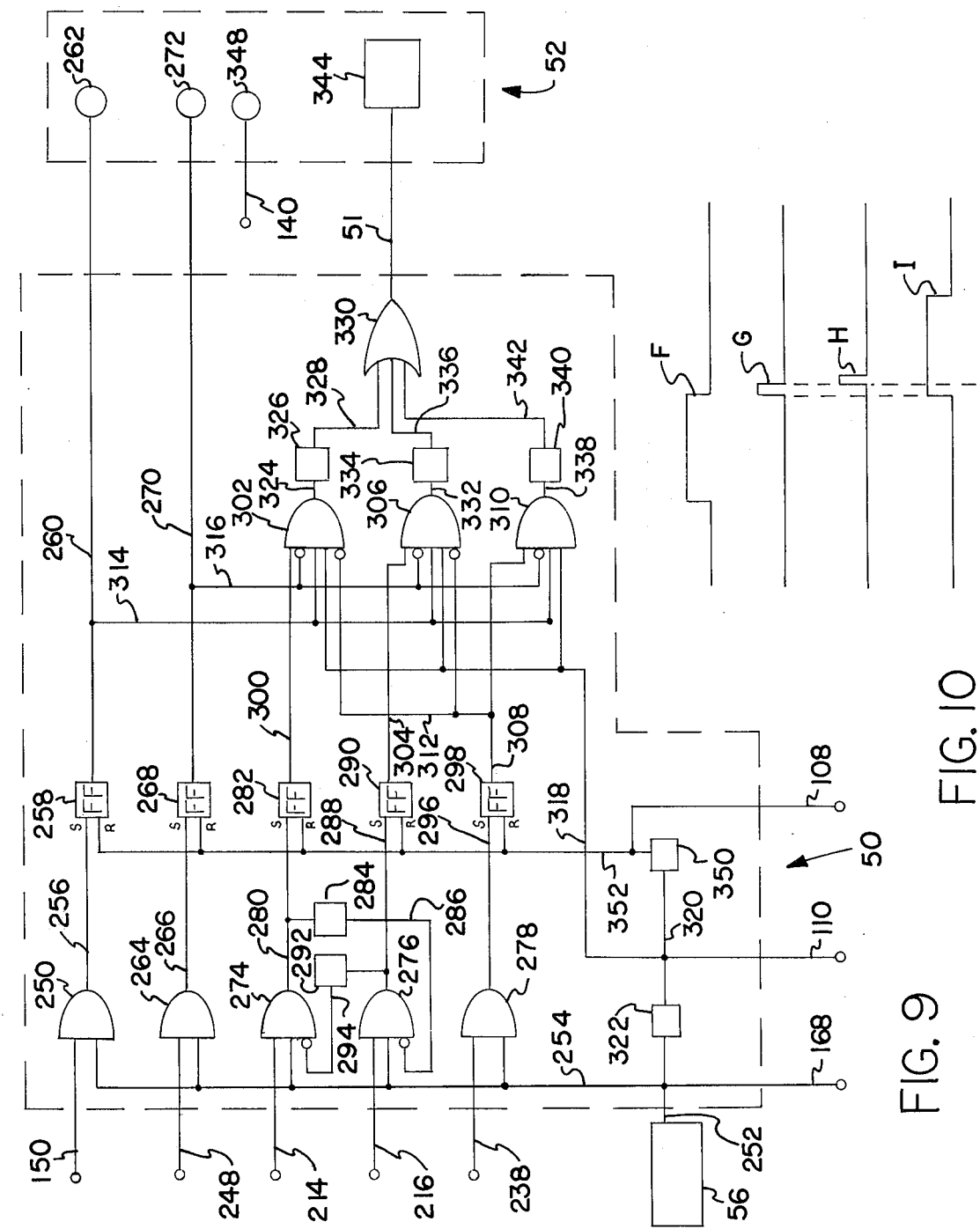
FIG. 9 is a schematic circuit diagram of the logic and reject and display units shown in FIG. 4.
FIG. 10 is a series of wave forms on a time base illustrating timing signals generated by the logic unit.

In FIG. 9, the output conductor 150 from the bottle presence circuit 58 is connected to one input terminal of a first AND gate 250. The gauge time switch 56 is also connected to the logic unit 50 through a conductor 252. A branch conductor 254 from the conductor 252 is conducted to a second input terminal of the first AND gate 250. Thus, the first AND gate 250 will produce an output signal along a conductor 256 when both the bottle presence signal and the gauge time signal are present at its input terminals. The conductor 256 is connected to the set terminal of a conventional flip flop 258 which has a set terminal, a reset terminal and an output terminal. When a signal appears on the conductor 256, the flip flop 258 is turned on and an output signal is generated along a conductor 260 which may turn on a light 262 located on the reject and display unit 52. The light 262 is an indication of a normal operational condition and should be on when the device is in a proper operating mode. Also entering the logic unit 50 is the conductor 248 from the out-of-position circuit 54. The conductor 248 is connected to one input terminal of a second AND gate 264. A second input to the second AND gate 264 is from the conductor 254 which is again the gauging time signal. The output of the second AND gate 264 is through a conductor 266 to the set terminal of a second flip flop 268. The second flip flop 268 is identical to the first flip flop 258. Normally, there will be no output signal present on the conductor 266. This is so since the out-of-position circuit 54 is designed to generate an output signal only in the event of an abnormal operational condition where one of the four light sensors 24 through 27 receives a signal. In the event this does occur, the signal to the set terminal of the second flip flop 268 will cause a signal to be generated on an output conductor 270 which will then light a warning light 272 located on the reject and display unit 52. A third input to the logic unit 50 is from the conductor 214 which carries defect information from the comparator unit 48 and in particular from the first operational amplifier 202. The conductor 214 is connected to a third AND gate 274. Another input to the third AND gate 274 is from the gauge time switch 56 and its branch conductor 254. Likewise, the conductor 216 is connected to one input of a fourth AND gate 276 and the conductor 238 is connected to one input terminal of a fifth AND gate 278. Both the AND gates 276 and 278 also have a second input from the branch conductor 254 carrying the gauging time signal information. The two inputs just described for the three AND gates 274, 276 and 278 would be sufficient to provide a valid output signal in the event that one of the three different types of defects had occurred. It will be noted in fact that the fifth AND gate 278 does in fact have only these two inputs to it. However, it is possible for a component of one of the signals L or C to be involved in the other signal at this point in the circuit. Therefore, it is desirable that when either the AND gate 274 or the AND gate 276 generates an output indicating the presence of a defect of that particular type that the other AND gate 274 or 276 be inhibited from generating such an output. Thus, the output of the AND gate 274 is through a conductor 280 connected to the set terminal of a third flip flop 282. The conductor 280 is also connected to a mono stable multi vibrator 284, or one shot as it will hereinafter be referred to. When a signal appears on the output conductor 280 it will trigger the one shot 284 to generate an output signal along a conductor 286 which is connected to an input terminal of the fourth AND gate 276. Note the circle at the input of the conductor 286 to the AND gate 276 indicating an inversion of the signal at this point. The signal inversion ensures that whenever a signal is present on the output conductor 280 the one shot 284 will furnish a signal which is inverted into the input of the AND gate 276 thus making it impossible for a signal on the input conductor 216 to trigger the AND gate 276 to generate an output signal itself. Similarly, the output of the fourth AND gate 276 is along a conductor 288 to the set terminal of a fourth flip flop 290. The output conductor 288 is also connected to a second one shot 292 which in turn has its output connected to one of the input terminals of the third AND gate 274 through an inverter. This again ensures that should an output signal appear on the conductor 288 the third AND gate 274 will be inhibited from generating an output signal on its output conductor 288 through the operation of the one shot 292 and the consequent inversion of the output signal, carried by a conductor 294, from the one shot 292 into the third and gate 274. The output of the fifth AND gate 278 is along a conductor 296 to the set terminal of a fifth flip flop 298. The output of the third flip flop 282 is through an electrical conductor 300 to a sixth AND gate 302. The output of the fourth flip flop 290 is connected through an electrical conductor 304 to a seventh AND gate 306. The output of the fifth flip flop 298 is connected through and electrical conductor 308 to an eighth AND gate 310. The conductor 308 carrying the signal from the fifth flip flop 298 is also connected to a branch electrical conductor 312 itself connected to inputs of the AND gates 302 and 306 through signal inverters. The purpose of this connection is to prevent any output from the AND gates 302 and 306 when there is an output present from the fifth flip flop 298. This assures that there will be only one rejection signal generated for any individual defect in the container rim 13. Note that the inversion of the signal carried by the conductor 312 into the AND gates 302 and 306 means that a negative or off signal will be present to these AND gates if a signal is present on the conductor 308 thus forcing the AND gates 302 and 306 to also be off. The signal indicating the presence of a glass container 10 which is carried on the conductor 260 is also connected as an input to all three of the AND gates 302, 306 and 310 through an electrical conductor 314. This signal is used to ensure that a glass container 10 is present for inspection before a rejection signal can be generated. Similarly, the electrical conductor 270, which will have a signal present thereon when one of the four out-of-position light sensors 24 through 27 senses the glass container 10 is not rotating properly, is also connected to all of the AND gates 302, 306 and 310 through a branch conductor 316. Note that the signal carried by the conductor 316 is inverted before it is entered into the AND gates 302, 306 and 310. This is necessary because the normal operational conditions are such that there is no signal present on the conductor 270. It is this condition which will allow passage or generation of an output signal by the respective AND gates. A final input to the AND gates 302, 306 and 310 is from a branch conductor 318 which is itself connected to a conductor 320 which carries the output from a third one shot unit 322. The third one shot unit 322 itself is triggered by the signal carried on the conductor 252 from the gauging time switch 56. Thus, all of the inputs to the AND gates 302, 306 and 310 must be on or in the high state before any one of these gates will generate an output. The output of the AND gate 302 is connected through an electrical conductor 324 to a fourth one shot unit 326. The output of the fourth one shot unit 326 is connected through an electrical conductor 328 to an OR gate 330. The output of the AND gate 306 is connected through an electrical conductor 332 to a fifth one shot unit 334 whose output is connected through an electrical conductor 336 to another input terminal of the OR gate 330. The output of the AND gate 310 is connected through an electrical conductor 338 to a sixth one shot unit 340 whose output in turn is connected through an electrical conductor 342 to another input terminal of the OR gate 330. The output of the OR gate 330 is connected to a reject relay 344 through the electrical conductor 51. An input into the 344 through the electrical conductor 51. An input into the OR gate 330 from any one of the AND gates 302, 306 or 310 will cause a signal to be produced on the electrical conductor 346 and will in turn trigger the reject relay 344 to cause rejection of a glass container 10 causing generation of such a signal in a fashion well known in the art. The actual rejection mechanism itself may take the form of a mechanical arm which is operated by a solenoid or an air cylinder or may simply be a puff of compressed air which is time by a solenoid valve operated by the reject relay 344. The conductor 140 from the out-of-calibration circuit 66 is connected to a light 348 mounted on the reject and display unit. When a signal is generated by the out-of-calibration circuit 66 a signal is produced on the conductor 140 which will cause the light 348 to be illuminated thus calling attention to this particular condition within the circuit.

The wave form of FIG. 20 illustrate the timing functions which are performed and were briefly referred to but not fully defined with respect to FIG. 9. All of the wave forms shown in FIG. 10 are on a common time base. The first wave form shown may be designated as F. This is the signal which appears on the conductor 252 connected to the output of the gauge time switch 56. The next wave form may be designated as G and is a wave form which is produced by the one shot unit 322. It will be noted that the one shot unit 322 is triggered by the falling of the gauge time signal or th F signal. It is the signal G which must be present at the AND gates 302, 306 and 310 to allow passage of a signal indicating that a defective glass container 10 has been detected. The next wave form is designated as H and it may be seen that this wave form is triggered by the falling edge of the wave form G. With reference now to FIG. 9 briefly, the wave form H is generated by a seventh one shot unit 350 which is connected through the electrical conductor 320 to the one shot unit 322. The output of the one shot unit 350, which is the waveform H, is connected through an electrical conductor 352 to the reset terminals of the flip flops 258, 268, 282, 290 and 298. This signal resets these flip flops to a zero output level in readiness for the next gauging cycle. Note that the wave form H is not generated until after the wave form G has allowed passage of the information contained in these flip flop units and until after the end of the gauging time signal designated as F. A final output wave form is designated as I and this is generated in response to the end of the gauging time signal or alternatively in response to the beginning of the wave form designated as G. The signal I is the output of the one of the shots units 326, 334 and 340 and contains information relative to the rejection of a defective glass container which is transmitted to the OR gate 330. the signal F is also transmitted to the first high pass filter 152 through the conductor 168 to perform the resistance switching function previously described. The signal G is transmitted through the conductor 110 to the second switch means 92 to activate this switch means. The wave form H is transmitted to the first switch means 90 through the conductor 108 to reset the capacitor 106 of the minimum detector means 88.

We claim:

1. Apparatus for inspecting the rim portion of glass containers having a finish portion with an annular rim portion extending around said finish portion and defining an opening into said glass container which comprises, in combination:
   a light source positioned above said rim portion to illuminate a portion of said rim;
   a main light responsive means, positioned above said rim portion to normally receive light reflected from said rim portion for generating a first electrical signal, having a substantially constant level, when said rim is without defects, and for generating a second electrical signal, above or below the level of said first signal, in response to a defect in said rim portion;
   means for rotating said glass container to thereby present all of said rim portion to said light source;
   first amplifying means, connected to said main light responsive means, for raising the level of said first and second electrical signal;
   logarithmic amplifying means, connected to said first amplifying means, for generating an output signal quantity representing the logarithm of said first and second electrical signals;
   second amplifying means, connected to the output of said logarithmic amplifying means, for raising the output signal quantity from said logarithmic amplifier and for correcting said output signal quantity for component variations;
   bandpass filter means, connected to said second amplifying means, for electrically discarding said first electrical signal and for electrically splitting said second electrical signal into two filtered signal components as a function of their respective frequencies;
   comparison means, connected to said bandpass filter means, for individually comparing one of said filtered signal components with a pre-selected level greater than and a first pre-selected level less than said first electrical signal level and for individually generating a defect signal when either of said levels are exceeded and for comparing the other one of said filtered signal components with a second pre-selected level less than said first electrical signal level and for generating a defect signal when said second pre-selected level is exceeded; and
   logic means, connected to said comparison means, for generating a defective bottle output signal in response to any defect signal from said comparison means.

2. The apparatus of claim 1 which further includes: a reject relay, operable in response to said defective bottle output signal, for controlling the rejection of defective glass containers.

3. The apparatus of claim 1 which further includes:
   means for generating an electrical signal quantity representing the product of the finish diameter of said glass containers and the inspection rate in container-per-unit time; and
   means for connecting said electrical signal quantity to said bandpass filter means to control the frequencies of said two filtered components as a function of said electrical signal quantity.

4. The apparatus of claim 3 which further includes: digital filter means, connected in series with the defect signal from said comparison means resulting from comparison with said second pre-selected level, for electrically removing defect signals of a width less than a pre-selected time period wherein the pre-selected time period is inversely proportional to said electrical signal quantity.

5. The apparatus of claim 4 wherein said digital filter means includes:
   two current type operational amplifiers each having a positive and a negative input terminal and an output terminal;
   a diode connecting said comparison means to the negative input terminal of a first one of said operational amplifiers;
   a first input resistor connecting the positive input terminal of said first one of said operational amplifiers to said electrical signal quantity;
   a capacitor connected in a feedback loop between said output terminal and said negative input terminal of said first one of said operational amplifiers;
   a second input resistor connecting the output terminal of said first one of said operational amplifiers to the positive input terminal of a second one of said operational amplifiers; and
   means connected to the negative input terminal of said second one of said operational amplifiers for providing a pre-selected level of electrical signal comparison, whereby a defect signal will be generated by said second one of said operational amplifiers when the output level from said first one of said operational amplifiers exceeds said pre-selected level.

6. The apparatus of claim 1 which further includes: zero correction means, connected in a feedback loop between the output of said logarithmic amplifying means and an input to said first amplifying means, for sensing the output of said logarithmic amplifier only when a glass container is not being inspected and for generating a correction signal to force the output of said first amplifying means to be zero at such times if said output of said first amplifying means is not zero.

7. The apparatus of claim 6 which further includes: out-of-calibration circuit means, connected to said zero correction means, for generating a warning signal whenever the output of said first amplifying means exceeds a pre-selected level when a glass container is not being inspected.

8. The apparatus of claim 1 which further includes: bottle presence circuit means, connected to the output of said first amplifying means and to an input of said logic means, for generating a bottle presence signal when a glass container is being inspected.

9. The apparatus of claim 1 which further includes:

a plurality of secondary light responsive means, positioned adjacent said main light responsive means in a location normally shielded from light from said rim, for generating a signal whenever light falls upon any one of said plurality of secondary light responsive means; and out-of-position circuit means, connected to said plurality of secondary light responsive means and to said logic means, for generating an out-of-position signal in response to receipt of a signal from any one of said plurality of secondary light responsive means.

10. The apparatus of claim 1 wherein said logarithmic amplifying means includes:

an operational amplifier having a positive and a negative input terminal and an output terminal, said positive input terminal being connected to ground;

an input resistor connected in series between the output of said first amplifying means and the negative input terminal of said operational amplifiers; and two diodes, connected in parallel in a feedback loop from the output terminal of said operational amplifier to the negative input terminal of said operational amplifier, one of said diodes being biased in one direction and the other diode being biased in the opposite direction.

11. The apparatus of claim 1 wherein said second amplifying means includes:

an operational amplifier having a negative input terminal, a grounded positive input terminal, and an output terminal;

an input resistor connected in series between said logarithmic amplifying means and the negative input terminal of said operational amplifier, a fixed feedback resistor connected in a feedback loop between the output terminal of said operational amplifier and the negative input terminal of said operational amplifier; and a temperature variable resistor, connected in series with said fixed feedback resistor.

12. The apparatus of claim 1 wherein said bandpass filter means includes:

a first high pass filter means, connected to said second amplifying means, for electrically discarding said first electrical signal;

a non-linear low pass filter means, connected to said first high pass filter means, for removing noise pulses independently of the magnitude of such pulses;

a second high pass filter means, connected to said non-linear low pass filter means,, for passing electrical signals as a filtered signal component only in the first pre-selected frequency range; and a third high pass filter means, connected to said non-linear low pass filter means, for passing electrical signals as a filtered signal component only in a second pre-selected frequency range.

13. The apparatus of claim 12 wherein said first high pass filter means includes:

a capacitor, connected in series in an electrical conductor between said second amplifying means and said non-linear low pass filter means; and a grounded resistor connected to said electrical conductor between said capacitor and said non-linear low pass filter means.

14. The apparatus of claim 13 wherein said apparatus further includes gauge time switch means for furnishing a gauging electrical signal during the time a glass container is being gauge and wherein said first high pass filter means further includes:

a second resistor connected to said electrical conductor between said capacitor and said non-linear low pass filter means, said second resistor having a value much less than said grounded resistor; and a transistor switching network for connecting said second resistor to ground when the gauging electrical signal is not present, thereby changing the time constant of said first high pass filter means to allow said bandpass filter means to stabilize during periods when glass containers are not being gauged.

15. The apparatus of claim 12 wherein said non-linear low pass filter means includes:

a first operational amplifier having a negative input termrinal connected to said first high pass filter means, a positive input terminal and an output terminal;

a second operational amplifier having a negative input terminal, a grounded positive input terminal, and an output terminal;

an input resistor connecting the output terminal of said first operational amplifier to the negative input terminal of said second operational amplifier;

a capacitor connected in a feedback loop between the output terminal of said second operational amplifier and the negative input terminal of said second operational amplifier; and an electrical conductor connecting the output terminal of said second operational amplifier to the positive input terminal of said first operational amplifier.

16. The apparatus of claim 1 wherein said comparison means includes:

three operational amplifiers each having a positive input terminal, a negative input terminal, and an output terminal;

an electrical conductor connecting one of said filtered signal components to the negative input terminal of a first one of said operational amplifiers;

means for furnishing said pre-selected comparison level greater than said first electrical signal level to the positive input terminal of said first one of said operational amplifiers, whereby said first one of said operational amplifiers will generate a defect signal when said one of said filtered signal components exceeds said pre-selected level greater than said first electrical signal level;

an electrical conductor connecting said one of said filtered signal components to the positive input terminal of a second one of said operational amplifiers;

means for furnishing a first pre-selected comparison level less than said first electrical signal level to the negative input terminal of said second one of said operational amplifiers, whereby said second one of said operational amplifiers will generate a defect signal when said one of said filtered signal components exceed said first pre-selected level less than said first electrical signal level;

an electrical conductor connecting the other one of said filtered signal components to the positive input terminal of a third one of said operational amplifiers; and means for furnishing a second pre-selected comparison level less than said first electrical signal level to the negative input terminal of said third one of said operational amplifiers, whereby said third one of said operational amplifiers will generate a defect signal when said other one of said filtered signal exceeds said second pre-selected level less than said first electrical signal level.

17. The apparatus of claim 6, wherein said apparatus further includes gauge time switch means for furnishing a gauging electrical signal during the time a glass container is being gauge and wherein said zero correction means includes:

a minimum detector means, connected to said logarithmic amplifier, for holding the minimum output level from said logarithmic amplifier means;

integrator means, connected to said minimum detector means and said first amplifier means, for integrating said minimum value and supplying said integrated value to said first amplifier means as a correction factor to thereby cause the output of said logarithmic amplifier means to be zero when glass containers are not being gauged; and switch means, connected in series between said minimum detector means and said integrator means, for blocking transmission of said minimum value to said integrator means while a glass container is being gauge and for passing said minimum value after gauging is completed.

18. The apparatus of claim 17 wherein said minimum detector means includes:

a first operational amplifier having positive and negative input terminals and an output terminal;

a first input resistor connecting said logarithmic amplifier to the positive input terminal of said first operational amplifier;

a second operational amplifier having positive and negative input terminals and an output terminal;

a feedback resistor connected in a feedback loop connecting the negative input terminal of said first operational amplifier to the output terminal of said second operational amplifier;

a second input resistor connecting the output terminal of said first operational amplifier to the postive input terminal of said second operational amplifier;

a ground capacitor connected to the positive input terminal of said second operational amplifier intermediate said second input resistor and said positive input terminal of said second operational amplifier;

and a diode, connected in series with said second input resistor intermediate said output terminal of said first operational amplifier and said second input resistor, biased to hold said grounded capacitor at the lowest value passed by said logarithmic amplifying means.

19. The apparatus of claim 17 wherein said integrator means includes:

an operational amplifier having a negative input terminal, a ground positive input terminal, and an output terminal connected to said first amplifying means;

a pair of diodes, connected in parallel, connecting said switch means to said negative input terminal, one of said diodes being biased in one direction and the other of said diodes being biased in the opposite direction; and a capaciator connected in a feedback loop between said output terminal and said negative input terminal.

20. In an apparatus for the inspection of glass containers, said glass containers having a finish portion with an annular rim defining an opening into the container, wherein glass containers are delivered one at a time to an inspection machine and wherein said glass containers are indexed through said inspection machine past a plurality of inspection stations at which inspection stations said glass containers are briefly halted and rotated about their vertical axis, an improved inpsection station for said apparatus which comprises, in combination:

a light sosurce positioned above said rim to illuminate a portion of said rim;

a main light responsive means, positioned above said rim to receive light reflected from said rim, for generating a first electrical signal, having a substantially constant level, when said rim is without defects, and for generating a second electrical signal, above or below the level of said first electrical signal, in response to a defect in said rim;

electronic circuit means, connected to said main light responsive means, for electronically removing said first electrical signal and for electronically frequency filtering said second electrical signal to produce two filter signal components having different frequency characteristics;

comparator means, connected to said electronic circuit means, for generating a defect signal if one of said filtered signal components exceeds either a pre-selected level greater than said first electrical signal level or a first pre-selected level less than said first electrical signal level and for generating a defect signal if the other one of said filtered signal components exceeds a second pre-selected level less than said first electrical signal level; and logic means, connected to said comparator means, for generating a defective bottle output signal in response to any defect signal from said comparator means.

21. The improvement of claim 20 which further includes: a reject relay, operable in response to said defective bottle output signal, for controlling the rejection of defective glass containers.

22. The improvement of claim 20 which further includes:

means for generating an electrical signal quantity representing the product of the finish diameter of said glass container and the inspection rate in containers per unit time; and means for connecting said electrical signal quantity to said electronic circuit means to control the frequencies of said two filtered components as a function of said electrical signal quantity.

23. The improvement of claim 22 which further includes: digital filter means, connected in series with the defect signal from said comparator means resulting from said other one of said filtered signal components, for electrically removing defect signals of a width less than a pre-selected time period wherin the pre-selected time period is inversely proportional to said electrical signal quantity.

24. The improvement of claim 20, which further includes:
- a plurality of secondary light responsive means, positioned adjacent said main light responsive means in a location normally shielded from light from said rim, for generating a signal whenever light falls upon any one of said plurality of secondary light responsive means; and
- out-of-position circuit means, connected to said plurality of secondary light responsive means and to said logic means, for generating an out-of-position signal in response to receipt of a signal from any one of said plurality of secondary light responsive means.

25. The improvement of claim 20 wherein said electronic circuit means comprises:
- first amplifying means, connected to said main light resonsive means, for raising the level of said first and second electrical signals;
- logarithmic amplifying means, connected to said first amplifying means, for generating an output signal quantity representing the logarithm of said first and second electrical signals;
- second amplifying means, connected to the output of said logarithmic amplifying means, for raising the output signal quantity from said logarithmic amplifier and for correcting said output signal quantity for component variations; and
- bandpass filter means, connected to said second amplifying means, for electrically discarding said first electrical signal and for electrically splitting said second electrical signal into two filtered signal components as a function of their respective frequencies.

26. The improvement of claim 25, which further includes: bottle presence circuit means, connected to the output of said first amplifying means and to an input of said logic means, for generating a bottle presence signal when a glass container is being inspected.

27. The improvement of claim 25 which further includes: zero correction means, connected in a feedback loop between the output of said logarithmic amplifying means and an input to said first amplifying means, for sensing the output of said logarithmic amplifier only when a glass container is not being inspected and for generating a correction signal to force the output of said first amplifying means to be zero at such times if said output of said first amplifying means is not zero.

28. The apparatus of claim 27, wherein said apparatus further includes gauge time switch means for furnishing a gauging electrical signal during the time a glass container is being gauged and wherein said zero correction means includes:
- minimum detector means, connected to said logarithmic amplifier, for holding the minimum output level from said logarithmic amplifier means;
- integrator means, connected to said minimum detector means and said first amplifier means, for integrating said minimum value and supplying said integrated value to said first amplifier means as a correction factor to thereby cause the output of said logarithmic amplifier means to be zero when glass containers are not being gauged; and
- switch means, connected in series between said minimum detector means and said integrator means, for blocking transmission of said minimum value to said integrator means while a glass container is being gauged and for passing said minimum value after gauging is completed.

29. The apparatus of claim 25 wherein said bandpass filter means includes:
- a first high pass filter means, connected to said second amplifying means, for electrically discarding said first electrical signal;
- a non-linear low pass filter means, connected to said first high pass filter means, for removing noise pulses independently of the magnitude of such pulses;
- a second high pass filter means, connected to said non-linear low pass filter means, for passing electrical signals as a filtered signal component only in a first pre-selected frequency range; and
- a third high pass filter means, connected to said non-linear low pass filter means, for passing electrical signals as a filtered signal component only in a second pre-selected frequency range.

30. In a method for inspecting the rim portion of glass containers having a finish portion with an annular rim portion extending around said finish portion and defining an opening into said glass containers wherein said glass containers are rotated about their vertical axes at an inspection station, the improvement in said method which comprises the steps of:
- illuminating said rim portion from a position above said rim portion;
- sensing light reflected from said rim portion;
- generataing a first electrical signal in response to said reflected light when said rim portion is free of defects;
- generating a second electrical signal, having a level above or below said first electrical signal level, in response to said reflected light when a defect is present in said rim portion;
- electronically discarding said first electrical signal;
- electronically frequency filtering said second electrical signal to produce two filtered signal components having different frequency characteristics;
- electronically generating a defect signal if one of said filtered signal components exceeds either a pre-selected level greater than said first electrical signal level or a first pre-selected level less than said first electrical signal level;
- electronically generating a defect signal if the other one of said filtered signal components exceed a second pre-selected level less than said first electrical signal level; and
- electronically generating a defective bottle signal in response to any defect signal.

31. The imprpoved method of claim 30 which includes the further step of:
- rejecting any glass container causing generation of said defective bottle signal in response to said defective bottle signal.

32. The improved method of claim 30 which includes the further steps of:
- electronically generating an electrical signal quantity representing the product of the finish diameter of said glass container and the inspection rate in containers per unit time; and
- electronically controlling the frequencies of said two filtered signal components as a function of said electrical signal quantity.

33. The improved method of claim 30 wherein the step of electronically discarding said first electrical signal includes the steps of:
- electronically amplifying said first and second electrical signals;
- electronically generating an output signal quantity representing the logarithm of said first and second electrical signals;
- electronically amplifying said output signal quantity; and
- electronically filtering said output signal quantity to remove the logarithm of said first electrical signal therefrom.

34. The improved method of claim 30 which includes the further steps of:
- sensing first electrical signal during periods when a glass container is not being inspected; and
- electronically forcing said first electrical signal to a zero value during such periods.

* * * * *

UNITED STATES PATENT OFFICE
CERTIFICATE OF CORRECTION

PATENT NO. : 3,880,750
DATED : April 29, 1975
INVENTOR(S) : Richard L. Butler & John W. Juvinall It is certified that error appears in the above-identified patent and that said Letters Patent are hereby corrected as shown below:

Abstract, line 4, "A light" should read ---about---.

Abstract, line 5 "Alight" should read ---A light---.

Col. 1, line 23, after "prior" insert ---art---.

Col. 1, line 33, after "one" insert ---or more---.

Col. 3, line 12, change "lighit" to read ---light---.

Col. 3, line 53, change "purpose" to read ---purposes---.

Col. 5, line 9, change "inhibited" to read ---inhibit---.

Col. 5, line 18, change "multiplifier" to read ---multiplier---.

Col. 5, line 63, after "mechanism" and before "an" insert ---of the inspection machine itself, and is designed to generate---.

Col. 6, line 15, change "exits" to ---exists---.

Col. 6, line 27, change "singal" to ---signal---.

Col. 6, line 52, after "circuit" and before "deleted" insert ---have their connections to the power supplies of the circuit---.

Col. 7, line 43, change "abe" to ---be---.

Col. 9, line 25, change "valve" to ---value---.

Col. 9, line 33, after "their" and before "terminals" insert ---output---.

Col.10, line 37, change "ana" to ---an---.

Col.13, line 24, change "finished" to ---finish---.

Col.13, line 59, change "singal" to ---signal---.

Col.13, line 59, after "any" and before "of" insert ---one---.

Signed and Sealed this twenty-third Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,880,750
DATED : April 29, 1975
INVENTOR(S) : Richard L. Butler & John W. Juvinall It is certified that error appears in the above-identified patent and that said Letters Patent are hereby corrected as shown below:

Col. 14, line 15, "flip" (second occurrence) should read ---flop---.

Col. 15, line 34, "and" should read ---an---.

Col. 16, line 32, "time" should read ---timed---.

Col. 16, line 41, "20" should read ---10---.

Col. 17, line 7, after "one" and before "shots" omit "of the".

Col. 17, line 7, "shots" should read ---shot---.

IN THE CLAIMS

Col. 17, line 39, "signal" should read ---signals---.

Col. 19, line 24, "amplifiers" should read ---amplifier---.

Col. 20, line 7, "gauge" should read ---gauged---.

Col. 20, line 22, "termrinal" should read ---terminal---.

Col. 21, line 10, after "signal" and before "exceeds" insert ---components---.

Col. 21, line 16, "gauge" should read ---gauged---.

Col. 21, line 32, "gauge" should read ---gauged---.

Col. 21, line 50, "ground" should read ---grounded---.

Col. 21, line 63 "ground" should read ---grounded---.

Col. 22, line 18, "sosurce" should read ---source---.

Col. 22, line 31, "filter" should read ---filtered---.

Col. 22, line 65, "wherin" should read ---wherein---.

Col. 24, line 31, "generataing" should read ---generating---.

Col. 24, line 49, "exceed" should read ---exceeds---.

Signed and Sealed this twenty-third Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,880,750

DATED : April 29, 1975

INVENTOR(S) : Richard L. Butler & John W. Juvinall

It is certified that error appears in the above-identified patent and that said Letters Patent are hereby corrected as shown below:

Col. 24, line 54, "imprpoved" should read ---improved---.

Col. 26, line 6, after "sensing" and before "first" insert ---said---.

Signed and Sealed this twenty-third Day of September 1975

[SEAL]

Attest:

RUTH C. MASON
*Attesting Officer*

C. MARSHALL DANN
*Commissioner of Patents and Trademarks*